(12) United States Patent
Loyning

(10) Patent No.: US 6,328,052 B1
(45) Date of Patent: Dec. 11, 2001

(54) BIDIRECTIONAL CHECK VALVE

(76) Inventor: Stephen M. Loyning, 1064 Vali Rd., Powell, WY (US) 82435

(*) Notice: Subject to any disclaimer, the term of this patent is extended or adjusted under 35 U.S.C. 154(b) by 0 days.

(21) Appl. No.: 09/755,101

(22) Filed: Jan. 8, 2001

(51) Int. Cl.$^7$ .................................................. F16K 15/03
(52) U.S. Cl. ..................... 137/1; 137/614.17; 137/527.8; 137/614.18; 15/3.5; 15/104.061
(58) Field of Search .................. 137/614.17, 614.18, 137/527.8, 1; 15/104.061, 3.5

(56) References Cited

U.S. PATENT DOCUMENTS

| | | | |
|---|---|---|---|
| 3,063,079 | * 11/1962 | Bergman et al. | ............... 15/104.061 |
| 3,348,569 | * 10/1967 | Frye | ................... 137/527.8 |
| 3,565,099 | * 2/1971 | Huber | ................... 137/527.8 |
| 4,598,735 | * 7/1986 | Pedersen | ............... 15/104.061 |
| 4,660,592 | * 4/1987 | Williams | ................... 15/3.5 |
| 4,928,725 | * 5/1990 | Gaves | ............... 137/614.17 |
| 4,989,631 | 2/1991 | Harbin | ............... 137/269.5 |

* cited by examiner

*Primary Examiner*—A. Michael Chambers
(74) *Attorney, Agent, or Firm*—Frank J. Kowalski

(57) ABSTRACT

A valve for controlling fluid flow while permitting flow in only one direction includes a housing having a spherical central opening and connections to permit attachment to fluid flow lines at opposite ends of the housing. The spherical opening is configured to permit fluid flow through the housing. A spherical member is adapted to fit within the spherical central opening of the housing. The spherical member has an opening bored through its center and may be aligned with the housing connections to allow fluid communication between them and positioned perpendicular to the housing connections to prevent fluid communication between them. A rotation member is provided to operate in conjunction with the spherical member to rotate the spherical member within the housing. A closing member is mounted within the spherical member, and is sized to close off the opening bored through the center of the spherical member for one direction of fluid flow. A mounting member is used for connecting the closing member to the spherical member whereby the closing member normally blocks fluid flow through the opening bored through the spherical member in only one direction and opens to fluid flow in the other direction.

20 Claims, 4 Drawing Sheets

BIDIRECTIONAL CHECK VALVE

BACKGROUND OF THE INVENTION

1. Field of the Invention

The present invention pertains to valves used in fluid flow applications and more particularly to valves used in fluid flow applications where the direction of flow must be controlled in addition to controlling the degree of fluid flow.

2. Related Art

In the area of transporting fluids from one location to another there are many situations where the flow of fluid must be free but only in one direction. This situation can occur whether the fluid flow is a hydrocarbon fluid, such as oil, or other fluids, natural gas, compressed air, such as fresh water. This can occur when transferring oil to or from tankers from or to tanks or transferring fresh water to a tank to dilute sewage. In any of these situations fluid flow is to be in only one direction and reverse flow can be anything from undesirable to dangerous. In other words, the fluid flow must flow only in one direction when the control valve restricting flow is opened. In most prior art applications, multiple valves, one fluid flow rate control valve and one check valve are used. In applications where the fluid flow can be in either direction, but only one direction at a time, a total of four valves, two flow rate control valves and two check valves are used. In some applications, two flow rate control valves and one gate valve are used. There are some combination gate and check valve devices that may be used, however, these arrangements are complicated and require two combination valves if fluid is to flow in either direction at specified times.

Presently, fluid flow control, specifically in oil fields, is performed by filing pipelines and various tanks and tank trucks using several different types of valve systems. In most instances, when fluid is being transferred from one location to another it is undesirable to have the flow reverse and backwash to the source. This is true whether transferring hydrocarbon fluids or water. Water being transferred may be fresh water and pumped into a tank or container having water of a different type, such as salt water, etc. To prevent reverse flow or backwash from occurring, a check valve is used in conjunction with the control valve that controls the rate of fluid flow. The check valve usually takes the form of a plate that swings out of the way when fluid is flowing in the desired direction. The plate swings shut when the fluid flow is reversed. To reverse the flow, the first valve is closed and a bypass valve that is connected around the two ends of the main valve is opened. This additional control valve may also be used in conjunction with a check valve to prevent backwash in the opposite direction.

This arrangement requires two fluid control valves, two check valves along with the requisite flanges, welds or other connections to ensure the integrity of the system.

An example of a ball valve being used a flow control valve is illustrated in U.S. Pat. No. 4,385,747, titled "Self-Relieving Seat and Ball Valve Incorporating the Same" issued to Paul Renaud, Jr. et al. This valve relates to an annular seat for use in a ball valve which has two groups of pressure relief passageways, each of which extends completely through the seat between its front and rear faces. This patent relates to a typical ball valve for controlling fluid flow with the addition of spaced ball valve seat rings to prevent back flow leakage through the use of the elastomeric valve seat rings.

An example of a check valve is illustrated in U.S. Pat. No. 4,437,485, titled "Check Valve" issued to Robert B. Goodman. This check valve includes a pair of valve elements. The first valve element is unseated during forward flow and is seated or checked by reverse flow. The second valve element is unseated by reverse flow, allowing the flow to reach the first valve element to aid in its seating for reverse flow.

U.S. Pat. No. 4,781,213, titled "Ball Check Valve" relates to a check valve which includes a chamber having two ports, and a central housing in which a ball moves freely from one port to the other and an elastomeric O ring is free to move transversely to the direction of travel of the ball. During forward flow, the ball does not impede the fluid flow. During reverse flow, the ball seats on the elastomeric O ring and closes off fluid flow.

Other examples of ball and check valves are contained in U.S. Pat. No. 4,543,986, titled "Ball Check Valve and Plate", 4,846,221 titled "Ball Valve with Built-In Check Valve", and 5,373,868 titled "Ball Valve with Modular Check Valve Assembly and Access Port".

A bidirectional control valve is generally illustrated in U.S. Pat. No. 5,174,544, titled "Normally Closed Pilot Operated Bi-Directional Poppet Valve". The valve of this patent relates to a normally closed pilot operated bidirectional poppet valve for controlling flow between first and second valve ports. When the pilot valve is closed, pressure is applied from whichever port is at the higher pressure to the poppet in a manner to hold the poppet closed. When the pilot valve is open, pressure is vented to whichever port is at the lower pressure in a manner to allow the poppet to open. Another example of a bidirectional valve is illustrated in U.S. Pat. No. 5,072,752 titled "Bidirectional Cartridge Valve".

As can be seen from the foregoing examples, there is nothing in the art that permits a simple, efficient valve system which allows controlled forward flow in either of two directions while preventing reverse flow in both cases.

Further, in many situations, the flow line must be pigged. In this process a Styrofoam plug or umbrella like device is run through the pipe line or flow line. This device is used to force out any moisture which has accumulated or any other impurity which may have settled in the line. It may also be used to carry a detector or other instrument to determine line integrity or potential structure defects. In either case, the device must fit tightly against the sides of the line. A line having any of the valves currently in use cannot be pigged in both directions or in some cases, cannot be pigged at all. This results in very costly procedures to clean or pig the lines where a valve is situated. In cases where lines cannot be pigged, defects cannot be detected until failure, which can be very costly, not only financially but also costly to the environment.

SUMMARY OF THE INVENTION

The present invention provides a solution to the problems of multiple valve assemblies to permit forward fluid flow in either one of two directions while restricting reverse flow. In addition, the valve assembly of the present invention permits flow which may be carrying a pig. The apparatus of the present invention provides a valve for controlling fluid flow while permitting flow in only one direction which includes a housing having a spherical central opening and ports or connections to permit attachment to fluid flow tubes at opposite ends of the housing. The spherical opening is arranged in line with the ports or flow tube connections to permit fluid flow through the housing. A spherical member is adapted to fit tightly within the spherical central opening of the housing. The spherical member has an opening bored through its center and may be aligned with the housing ports or end connections to allow fluid flow through the valve. A rotation member or valve stem is provided to operate in conjunction with the spherical member to rotate the spherical member within the housing. A closing member is hingeably mounted within the opening of the spherical member, and is sized to close off the opening bored through the center of the spherical member. A mounting member is used for connecting the closing member to the spherical member whereby the closing member normally blocks fluid flow through the opening bored through the spherical member in only one direction. When flow is permitted, the closing member swings totally out of the fluid flow path to allow unrestricted flow. The spherical member may be rotated one hundred eighty degrees to block fluid flow in the opposite direction. The spherical member may also be rotated between zero and ninety degrees or any amount of rotation within three hundred degrees to restrict the rate of fluid flow through the valve or to close fluid flow completely.

The valve of the present invention has many applications. For example, at many pipeline river crossings there is a motor-operated valve on one side and on the other side there is a manual operated gate valve and a check valve. The apparatus of the present invention eliminates the need for both the manual operated valve and the check valve.

At light product and asphalt terminals on the discharge of pumps, gate valves and check valves are typically installed as a standard design. The valve of the present invention would require only one valve to be installed, with savings in both material and installation time. Also, at light product and asphalt terminals on the receipt piping into the tank there is typically a gate valve and a check valve. The valve of the present invention would require only one valve to be installed.

In most convenience stores across the country dual pumps are required to supply dispensers and ball valves and check valves are utilized. The valve system of the present invention permits the use of only one valve assembly.

Where water is being transported, backwash can be prevented through the use of the valve of the present invention. The prevention of backwash can be significant where fresh water is being used to flush out contamination by pumping the fresh water into the contaminated lines.

DESCRIPTION OF THE PREFERRED EMBODIMENT

The valve of the present invention may be used at any location where fluid flow must be in one direction only with no toleration for backwash and the direction of flow can be in either direction. One case where these capabilities are required is at hydrocarbon pipeline river crossings. In general, there is a motor operated valve on one side and on the other side there is a manual operated gate valve and a check valve. The use of the valve of the present invention can eliminate the need for both the manual operated valve and the check valve.

Again in the hydrocarbon area, at light product and asphalt terminals on the discharge of pumps, the present invention may be used to replace the need for separate control valves and check valves. The valve of the present invention would require only one valve to be installed, with savings in both material and installation time. Also at light product and asphalt terminals, the present invention may be used on the receipt piping into the tank where there is typically a control valve and a check valve.

The present invention can be used in most convenience stores across the country where dual pumps are required to supply dispensers and ball valves along with check valves are utilized.

The present invention provides a simple solution to the problem of a complicated valve system for filling and emptying storage tanks near oil fields or in any situation where single direction fluid flow is mandated in either of two directions.

The present invention also provides a solution to the problem of running a pig through flow lines that have valve systems in the line. The valve system of the present invention provides a bidirectional check valve in which the closing member to prevent reverse flow moves totally out of the fluid flow path. By being configured in this manner, the present invention allows the control of fluid flow in lengthy lines which may have the direction of flow changed while allowing the lines to be pigged.

Figure 1:
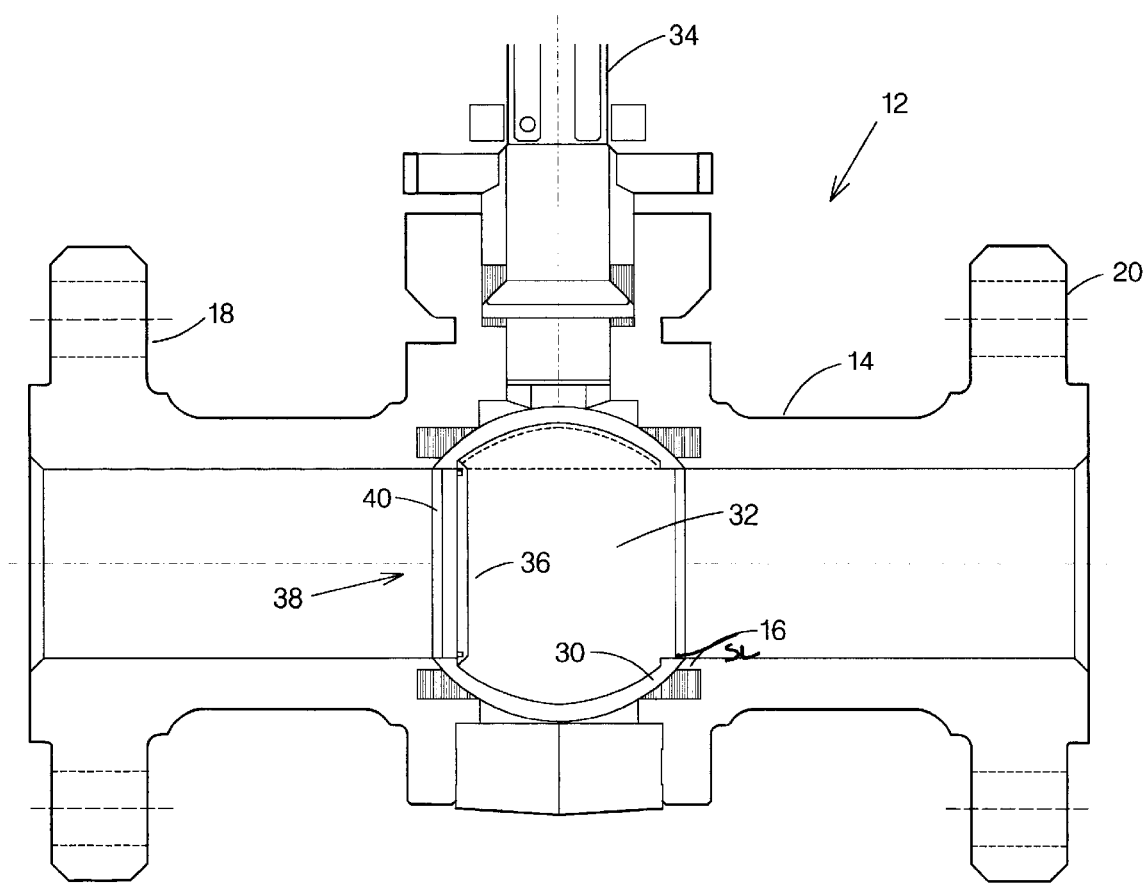
FIG. 1 is a side cutaway view of a bidirectional check valve.

Referring now to FIG. 1, a valve system 12 of the present invention is illustrated as including a housing 14 having a spherical opening 16 and connection openings or flanges 18 and 20 to permit attachment to fluid flow lines (not shown) at opposite ends of housing 14. Although flanges 18 and 20 are illustrated, this is for convenience only and configurations for attachment to fluid flow lines may take any form, such as welded ends, threaded ends for receiving couplings or, in the case of plastic or polymer pipe, smooth pipe ends for receiving glued couplings.

Spherical opening 16 is arranged in line with connection openings or flanges 18 and 20 to permit fluid flow through housing 14. A spherical member 30 is adapted to fit tightly within spherical opening 16 of housing 14. Spherical member 30 has an opening 32 bored through its center to be aligned with connection openings or flanges 18 and 20 of housing 14 to allow fluid flow through valve system 12.

A rotation member 34 is provided to operate in conjunction with spherical member 30 to rotate spherical member 30 three hundred sixty degrees within spherical opening 16 of housing 14. Rotation member 34 may be of any type of valve stem currently in use in the art. It may include a removable handle and stem as depicted in the preferred embodiment or may be a fixed or screw fastened circular handle on a fixed valve stem. The valve stem may be cast with spherical member 30 or may be welded in place or any other methods currently in use in the art.

A closing member 36 is hingeably mounted within opening 32 of spherical member 30, and is sized to close off opening 32 at one end 38 of spherical member 30. Complete closure of end 38 of opening 32 is accomplished by providing polymer O-ring 39 fitted between end 38 and closing member 36. O-ring 39 may either be fitted on closing member 36 or on end 38 as long as the space between closing member 36 and end 38 is fluid tight.

A mounting member 40 is used for connecting closing member 36 to spherical member 30 whereby closing member 36 normally blocks fluid flow through end 38 of opening 32 in only one direction. When fluid flows in the opposite direction, closing member 36 swings out of the flow of fluid and provides a completely open passage. Spherical member 30 may be rotated ninety degrees to totally block fluid flow. Spherical member 30 may be rotated one hundred eighty degrees by turning rotation member 34 to block fluid flow in the opposite direction through the operation of closing member 36.

Opening 32 is enlarged at its upper end 42 of spherical opening 16 to receive closing member 36. Closing member 36 is configured to fit within upper end 42 of opening 32 of spherical member 30 so as to be withdrawn completely from the path of fluid through opening 32. This arrangement permits the use of pigs (not shown} through the flow line without impeding their movement. Closing member 36 may be constructed of various materials that provide sealing along with durability, such as Kevlar, (trademark of DuPont), other durable polymers, certain ceramics, etc.

Figure 2:
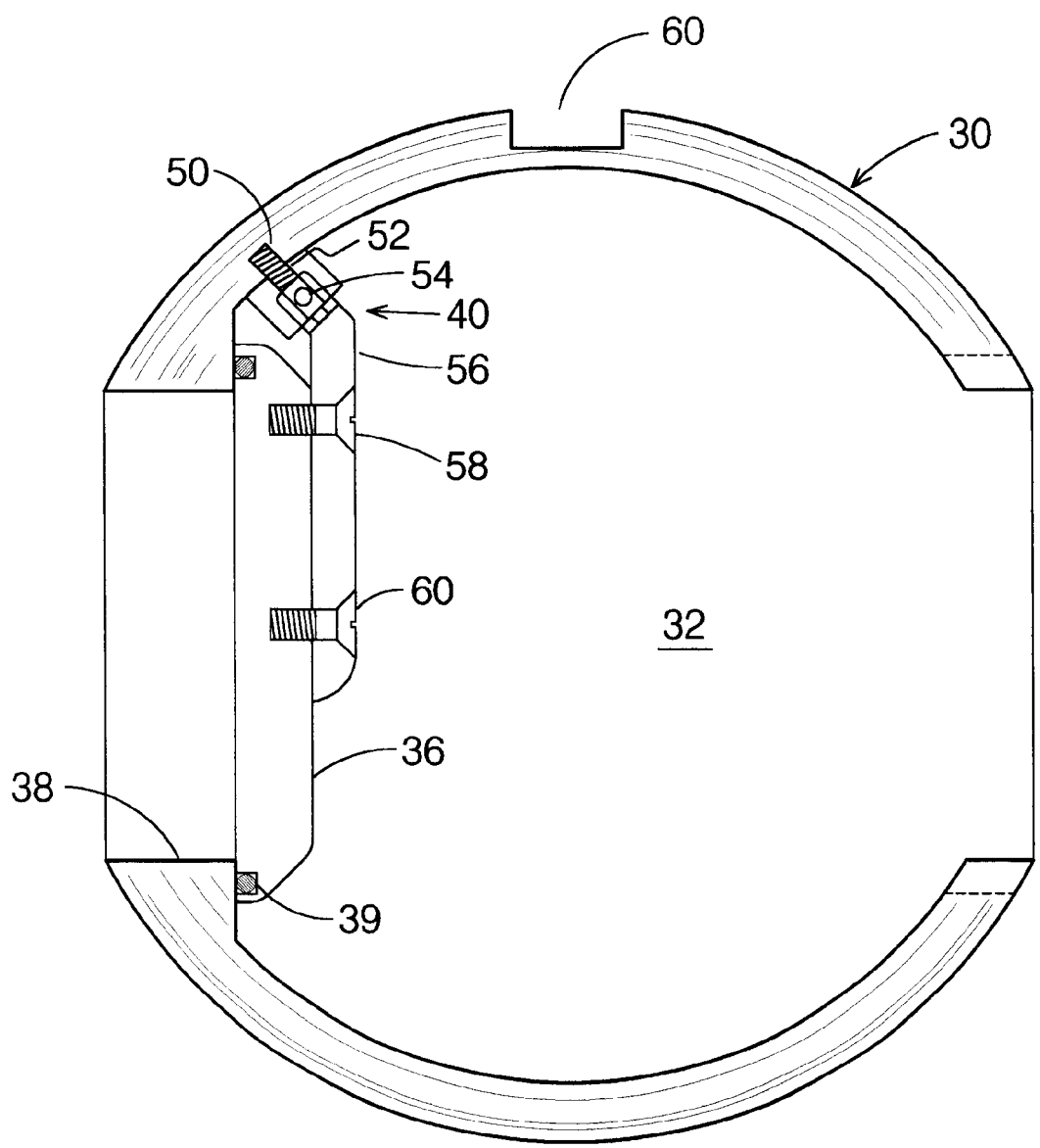
FIG. 2 is a side view of the spherical center member of the bidirectional check valve illustrated in FIG. 1 aligned for fluid flow in one direction.

FIG. 2 is a cut away side view of spherical member 30 illustrating closing member 36 and mounting member 40 at end 38 of spherical member 30. Mounting member 40 includes a screw tap 50 for receiving screw 52. Screw 52 holds hinge frame 54 on upper end 42. However, frame 54 may be held in place by any means, such as welding etc. as long as it is in position to receive a pin 56 slideably mounted therethrough. Pin 56 also fits through hole 58 on bracket 60. Bracket 60 is mounted on closing member 36 by screws 62 and 64. Although bracket 60 is mounted to closing member 36 via screws 62 and 64, bracket 60 may be mounted to closing member 36 by welding, when closing member is metal, or any other method used in the art to secure members together. Further, mounting member 40 may be cast in a mold with closing member 36 so that they are cast as one piece.

Mounting member 40 may be any one of a variety of mounting arrangements, the only essential feature being that closing member 36 be capable of moving to provide unrestricted fluid flow through spherical member 30.

Spherical member 30 also includes a cut out portion 60 adapted to receive rotation member 34. In operation, rotation member 34 fits into cut out portion 60 and locks in place so that when rotation member 34 is turned, spherical member 30 is rotated within a plane. In this manner, end 38 of opening 32 may be rotated so that, for example, end 38 may be directed from aligning opening 32 with flange 18 to aligning opening 32 with flange 20. However, as discussed previously, rotation member 34 may be of any type valve stem assembly currently in use in the art as long as it permits a continuous three hundred sixty degree rotation.

Figure 3:
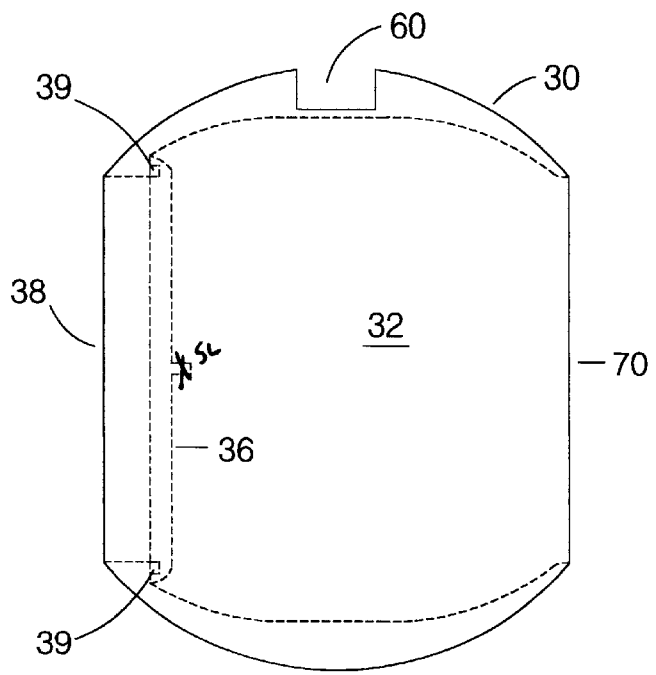
FIG. 3 is a side view of the spherical center member of the bidirectional check valve illustrated in FIG. 1 aligned for fluid flow in a direction of that illustrated in FIG. 1.
Figure 4:
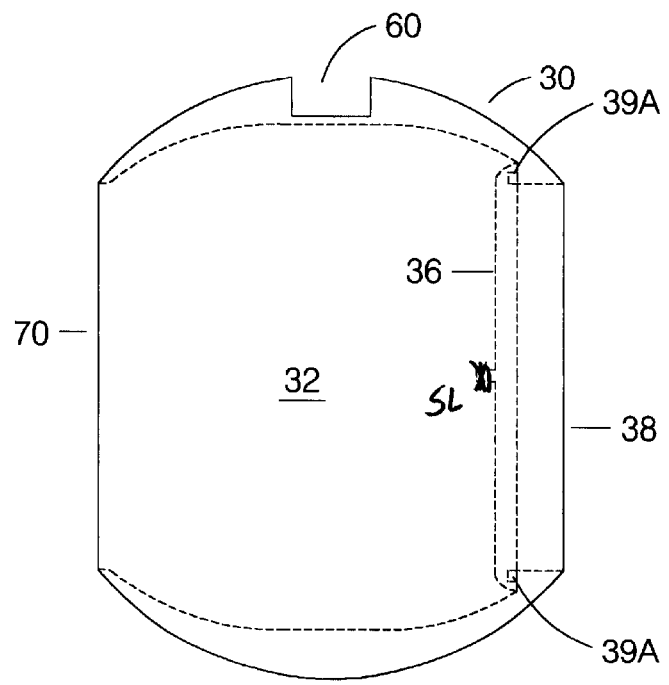
FIG. 4 is a side view of the spherical center member of the bidirectional check valve illustrated in FIG. 1 aligned for fluid flow in a direction directly opposite of that illustrated in FIG. 1.

FIGS. 3 and 4 illustrate side views of spherical member 30 positioned for flow in each direction. In FIG. 3, fluid flow is permitted to the right while blocking fluid flow to the left. In FIG. 3, O-ring 39 is illustrated as being located at the outer periphery of closing member 36.

FIG. 4 illustrates the configuration for permitting fluid flow to the left while blocking fluid flow to the right. In FIG. 4, O-ring 39A is illustrated as being located on the periphery of opening 32 at end 38 of spherical member 30.

Figure 5:
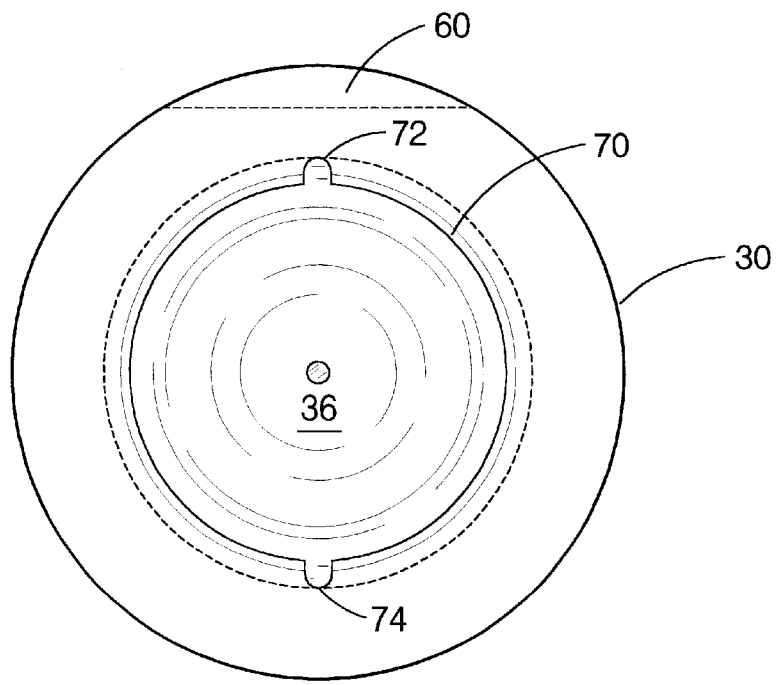
FIG. 5 is an end view of the opening of spherical center member of the bidirectional check valve of FIG. 1 which includes the check valve gate.
Figure 6:
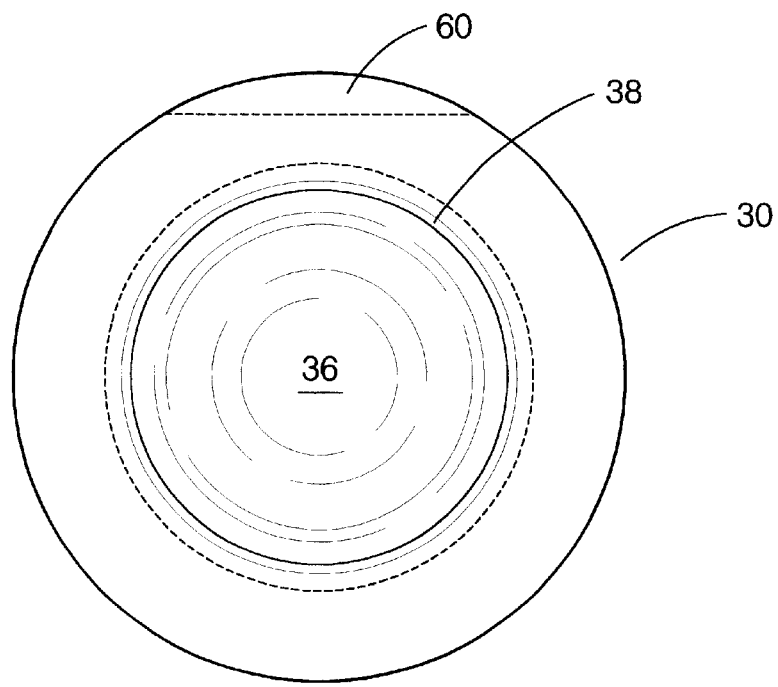
FIG. 6 is an end view of the opening of spherical center member of the bidirectional valve of FIG. 1 illustrating the side opposite that depicted in FIG. 5.

Referring to FIG. 5, an end view of spherical member 30 is illustrated showing end 70 of opening 32 of spherical member 30. Cutouts 72 and 74 are illustrated to provide a means to insert closing member 36 into opening 32 and positioning closing member 36 to restrict fluid flow through opening 32 in one direction. Although cutouts 72 and 74 are illustrated, provision for insertion of closing member 36 can be made by machining end 70 to have a diameter slightly greater than that of closing member 36. In the alternative, making closing member 36 out of a durable polymer will permit insertion by bending or flexing without the need for cutouts 72 and 74.

In operation, valve system 12 may be closed by rotating spherical member 30 so that ends 38 and 70 are perpendicular to the flow path of the flow lines blocking flow. To open valve system 12, spherical member 30 is rotated so that ends 38 and 70 align with the flow path of the flow lines, exposing opening 32 to fluid flow. The flow is permitted from end 38 to end 70 while blocking flow from end 70 to end 38. This permits flow either to the left or right, depending on the orientation of spherical member 30. To restrict flow, spherical member need not be rotated completely, the flow rate dependent upon the amount of rotation of spherical member 30. Closing member 36 will operate regardless of the angle at which fluid is incident upon its surface. However, it is to be noted that the flow line may not be pigged unless valve assembly 12 is in the full open position.

As described, the valve of the present invention may be used at any location where a control valve is needed along with a check valve. This may be at pipeline river crossings where there is a motor operated valve on one side and a manual operated gate valve and a check valve on the other side, at light product and asphalt terminals on the discharge of pumps and on the receipt piping into the tank where there is typically a gate valve and a check valve. The present invention can also be used in most convenience stores across the country where dual pumps are required to supply dispensers and ball valves and check valves are utilized. In addition, the valve system of the present invention may be used in conjunction with any fluid lines whether hydrocarbons, water or any non-corrosive fluid. By changing the material of which the valve system of the present invention is constructed to materials not affected by the corrosive nature of the fluid it can be used to control flow of corrosive fluids.

The present invention provides a simple solution to the problem of a complicated valve system for filling and emptying storage tanks near oil fields and elsewhere. The present invention also provides a solution to the problem of running a pig through flow lines that have valve systems in the line. By providing a bidirectional check valve in which closing member 36 moves totally out of the fluid flow path, the present invention allows the control of fluid flow in lengthy lines which may have the direction of flow changed while allowing the lines to be pigged. In the full open position, the valve system 12 of the present invention provides a flow control gate valve that offers no restriction to fluid flow allowing moisture removal devices or other types of instrumentation to pass freely through the flow line.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for controlling fluid flow in one direction while preventing fluid flow in another direction comprising:

connecting a first fluid line and a second fluid line to different ends of a housing;

placing a spherical center portion having a open cylindrical center within said housing, said open cylindrical center having a diameter at least equal to said first and said second fluid line;

rotating said spherical center portion so that said cylindrical center aligns with said fluid lines to permit said fluid flow;

rotating said spherical center so that said cylindrical center is perpendicular to said fluid lines to block said fluid flow;

positioning a blocking member configured at one end of said cylindrical center to block said fluid flow from said first fluid line to said second fluid line while permitting said fluid flow from said second fluid line to said first fluid line, allowing a pig to travel unrestricted from said second fluid line through said spherical center portion to said first fluid line when said cylindrical center aligns with said fluid lines; and rotating said spherical center portion one hundred eighty degrees to block said fluid flow from said second fluid line to said first fluid line while permitting said fluid flow from said first fluid line to said second fluid line, allowing a pig to travel unrestricted from said first fluid line through said spherical center portion to said second fluid line when said cylindrical center aligns with said fluid lines.

2. The method for controlling fluid flow in one direction while preventing fluid flow in another direction according to claim 1 also including:

rotating said spherical center portion so that said cylindrical center is partially between aligned with said fluid lines and perpendicular to said fluid lines to control fluid flow rate.

3. The method for controlling fluid flow in one direction while preventing fluid flow in another direction according to claim 1 wherein said positioning a blocking member includes:

fastening said blocking member at one end of said cylindrical center so that it blocks said fluid flow that flows through said cylindrical center before being incident upon said blocking member.

4. The method for controlling fluid flow in one direction while preventing fluid flow in another direction according to claim 3 wherein said fastening said blocking member at one end includes:

configuring said blocking member so that it moves out of the path of said fluid flow that is incident upon said blocking member before said fluid flow flows through said cylindrical center.

5. The method for controlling fluid flow in one direction while preventing fluid flow in another direction according to claim 1 also including:

pigging said first fluid line and said second fluid line.

6. A valve for controlling fluid flow while permitting flow in only one direction comprising:

a housing having a spherical central opening and flanges to permit attachment to fluid flow tubes at opposite ends of said housing, said spherical opening configured to permit fluid flow through said housing;

a spherical member adapted to fit tightly within said spherical central opening, said spherical member having an opening the same size as said fluid flow tubes bored through the center of said spherical member and aligned with said flanges;

a rotation device for rotating said spherical member within said housing;

a closing member hingeably mounted within said spherical member, sized to close off said opening bored through said center of said spherical member for flow in one direction while allowing totally unrestricted flow in the opposite direction; and mounting member for connecting said closing member to said spherical member whereby said closing member normally blocks fluid flow through said opening bored through said spherical member in only one direction and whereby said closing member is completely removed from said fluid flow in the opposite direction to allow passage of a pig through said fluid flow tubes.

7. A valve for controlling fluid flow while permitting flow in only one direction comprising:

a housing having a central opening and connections to permit attachment to fluid flow lines at opposite ends of said housing;

a center member rotatable three hundred sixty degrees within said housing for controlling fluid flow between said connections in both directions; and a closing member mounted within said center member and configured to permit uninhibited fluid flow in one direction at a time permitting a line pig to pass through said center member while completely blocking reverse fluid flow.

8. The valve for controlling fluid flow while permitting flow in only one direction according to claim 7 wherein said central opening comprises a generally spherical opening.

9. The valve for controlling fluid flow while permitting flow in only one direction according to claim 7 wherein said connections include flanges.

10. The valve for controlling fluid flow while permitting flow in only one direction according to claim 7 wherein said connections include welded collars.

11. The valve for controlling fluid flow while permitting flow in only one direction according to claim 7 wherein said center member is spherical shaped.

12. The valve for controlling fluid flow while permitting flow in only one direction according to claim 11 wherein said center member includes a cylindrical center passage.

13. The valve for controlling fluid flow while permitting flow in only one direction according to claim 12 wherein said closing member includes a hinge mounting at one end of said cylindrical center passage.

14. The valve for controlling fluid flow while permitting flow in only one direction according to claim 13 wherein said closing member has first normally closed position wherein flow is blocked in one direction and a second active position wherein said closing member is out of the path of fluid flow.

15. The valve for controlling fluid flow while permitting flow in only one direction according to claim 13 wherein said closing member is made of metal.

16. The valve for controlling fluid flow while permitting flow in only one direction according to claim 13 wherein said closing member is made of a durable polymer.

17. The valve for controlling fluid flow while permitting flow in only one direction according to claim 13 wherein said closing member is made of ceramic material.

18. The valve for controlling fluid flow while permitting flow in only one direction according to claim 13 wherein said hinge mounting is welded on said closing member.

19. The valve for controlling fluid flow while permitting flow in only one direction according to claim 13 wherein said hinge mounting is cast as part of said closing member.

20. The valve for controlling fluid flow while permitting flow in only one direction according to claim 13 wherein said hinge mounting is fastened on said closing member by screws.

* * * * *